June 29, 1965    H. W. HEIMBRUCH ETAL    3,191,959
COLLAPSIBLE HAND CART

Filed Jan. 23, 1964      2 Sheets-Sheet 1

INVENTORS
HOWARD W. HEIMBRUCH
BY M. L. KEENAN

ATTORNEYS

June 29, 1965  H. W. HEIMBRUCH ETAL  3,191,959
COLLAPSIBLE HAND CART
Filed Jan. 23, 1964  2 Sheets-Sheet 2

INVENTOR.
HOWARD W. HEIMBRUCH
BY MAURICE L. KEENAN

ATTORNEYS

United States Patent Office 3,191,959
Patented June 29, 1965

3,191,959
COLLAPSIBLE HAND CART
Howard W. Heimbruch and Maurice L. Keenan, Pasadena, Calif., assignors to Foremost Dairies, Inc., San Francisco, Calif., a corporation of New York
Filed Jan. 23, 1964, Ser. No. 339,781
5 Claims. (Cl. 280—36)

This application is a continuation-in-part of application Serial No. 256,720, filed February 6, 1963, now abandoned.

This invention relates generally to hand carts such as are suitable for warehousing, supermarkets, and other mercantile establishments.

Conventional hand carts which have been used in the past in warehousing and various mercantile establishments, have been lacking in convenience and versatility. For example, lightweight hand carts such as have been available for supermarkets have occupied excessive space when full, and they have not been collapsible to occupy a minimum amount of space when not in use. Furthermore, they have lacked maneuverability and handling convenience for the various uses to which such devices are put in retail establishments.

In general, it is an object of the present invention to provide a hand cart which is well adapted for the purposes mentioned above, and which avoids some of the defects of prior devices of this kind.

Another object of the invention is to provide a hand cart which permits two or more carts to be closely nested together, when full.

Another object of the invention is to provide a hand cart which has better weight distribution upon the wheels, and which permits a full cart to be moved down a ramp without tilting forward.

Another object of the invention is to provide a hand cart which permits more leverage during wheeling, and which facilitates tilting to a two-wheel wheeling position.

Additional objects and features of the invention will appear from the following description in which the preferred embodiment has been set forth in detail in conjunction with the accompanying drawing.

Referring to the drawing.

Figure 1:
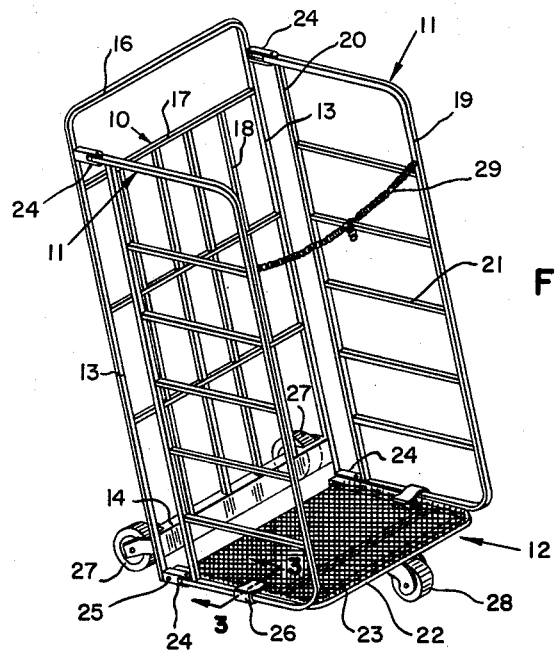
FIGURE 1 is a perspective view illustrating a hand cart made in accordance with the present invention.
Figure 3:
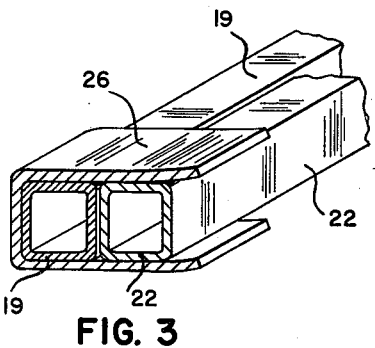
FIGURE 3 is a cross-sectional detail on an enlarged scale, taken along the line 3—3 of FIGURE 1.

The hand cart shown in FIGURE 1 consists of a main frame 10, together with side structures 11, and a bottom structure 12. The main frame 10 can consist of the metal tubes or like structural side members 13, which are joined at their lower ends by the cross member 14, and at their upper ends by member 16, which serves as a handle. Cross members 17 and the longitudinal members 18 are secured together and to the members 13 and 14 of the frame, as by welding.

Each of the side structures 11 can consist of a tube or like structural member 19, which is bent U-shaped, and which is provided with the connected longitudinal and cross members 20 and 21.

The bottom structure 12 can consist of a metal tube or like member 22 bent U-shaped with its ends connected by cross members 22a. This forms a frame to which the expanded metal 23 is attached.

The side structures 11 are connected to the frame 10 by hinges or pivotal connections 24. The bottom structure is similarly connected to the lower part of the frame 10 by hinges or pivotal connections 25. Normally the side and bottom structures extend substantially at right angles to the general plane of the frame 10.

Suitable means are provided whereby the lower edges of the side structures are detachably secured to the side edges of the bottom structure. Preferably this means is in the form of spring clips 26 which are secured to the tubes 19 as by welding, and which are adapted to clip over adjacent portions of the tubes 22 of the bottom structure. When the side and bottom structures are so secured together, a vertically extending carrying space is formed which is open at the front and top.

Figure 2:
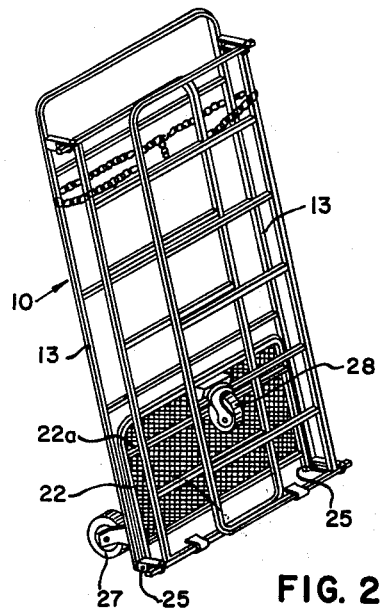
FIGURE 2 is a perspective view of our hand cart in collapsed position.

A pair of ground engaging wheels 27 are mounted upon the lower portion of the frame 10, and extend from the rear side of the frame, as shown in FIGURE 2. In addition, a single ground engaging wheel 28, of the caster type, is shown mounted upon the forward portion of the bottom structure 12.

The side and bottom structures can be collapsed in the manner shown in FIGURE 2. To accomplish this, the spring clips 26 are disengaged by applying outward forces to the side structures 11, and the bottom structure is swung upwardly against the frame. Thereafter, the side structures are swung inwardly across each other, and over the bottom structure. In this connection, it will be noted that the single caster wheel 28 is disposed whereby it is accommodated between the members 21 of the side structures.

A retaining chain or chain lengths 29 can be attached to the side structures 11 as shown in FIGURE 1. This chain is provided with a suitable clip attaching means, whereby it can be detached during collapsing. When collapsed the chain lengths can be wrapped about members 21 and connected together to retain the parts in collapsed condition.

Figure 4:
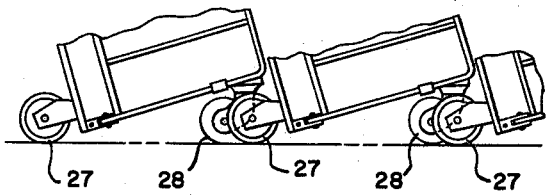
FIGURE 4 is a detail illustrating how two carts can be nested when full.

The hand cart described above has a number of desirable features. Assuming that the side and bottom walls are extended with the clips 26 engaged, the cart rests at an inclination as shown in FIGURE 4. When the cart is filled with stacked items, such as cases containing cartons of milk or the like, it has stable equilibrium upon the three wheels. FIGURE 4 illustrates how the carts can be nested, to occupy a minimum of space. Thus the front side of the lefthand cart is shown in close proximity with the rear side of the righthand cart, and when so positioned the forward edge of the bottom structure of the lefthand cart overlies the rear wheels 27 for the righthand cart.

In supermarkets and like establishments it is frequently necessary to move the full carts down a ramp. With the tilted construction described above, the carts can be moved down a ramp without forward tilting and with the weight being distributed upon three wheels.

The normally tilted position of the cart also facilitates further tilting to lift the wheel 28 clear of the ground, as is frequently desired for special maneuvering. Also it distributes the weight in such a manner that when proceeding forwardly on three wheels, more force can be exerted upon the handle 16, without tilting the cart forwardly. In other words, more leverage can be exerted in wheeling the cart.

Figure 5:
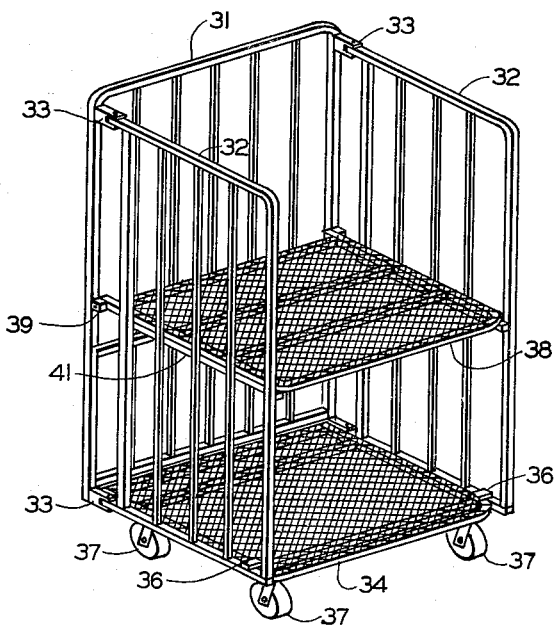
FIGURE 5 is a perspective view like FIGURE 1, but showing another embodiment.
Figure 6:
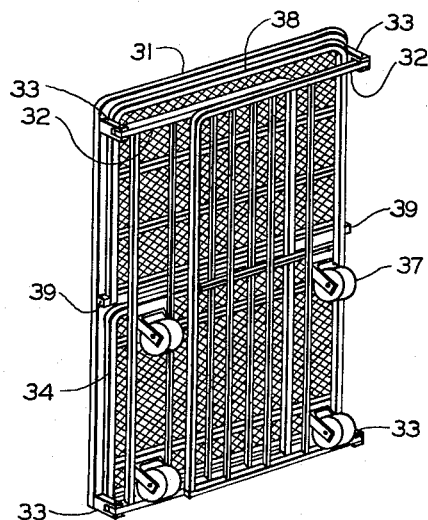
FIGURE 6 is a perspective view of the cart of FIGURE 5 in collapsed condition.

In the embodiment of FIGURE 5, the cart likewise comprises a main frame 31, together with the side structures 32 that are secured to the main frame by hinge connections 33. Also there is a bottom structure 34 that is hinged to the bottom portion of the main frame and which has clips 36 for engaging the side structures. In this instance four caster wheels 37 are attached to the bottom structure 34. Also an additional shelf structure 38 is provided, which has hinge connections 39 with the main frame and which normally is supported by the rails or bars 41 on the side structures. Here again the assembly can be collapsed as shown in FIGURE 6 by disengaging clips 36, swinging bottom structure 34 and shelf 38 upwardly, and then swinging side structures 32 inwardly.

We claim:

1. In a hand cart, a generally rectangular main frame, a pair of side structures hingedly connected to parallel side portions of the frame for independent swinging movement relative to the frame, a bottom structure hingedly connected to a horizontal lower portion of the frame for independent swinging movement, said side and bottom structures together with the frames serving to define a vertically extending carrying space that is open at its front, when the side and bottom structures extend in planes at right angles to the general plane of the frame, wheel means mounted on the lower end of the cart, and means for detachably securing the lower edges of the side structures to the bottom structure, said means being detached by swinging the side structures in directions away from the bottom structure and about the axes of the pivotal connections between the side structures and the main frame, said side and bottom structures when said last means is disengaged being collapsible upon each other adjacent the front side of the frame.

2. A hand cart as in claim 1 in which wheel means is carried by said bottom structure.

3. A hand cart as in claim 1 in which said means for detachably securing the lower edges of the side structures to the bottom structure comprises a pair of retaining clips, said clips being mounted upon the lower edges of said side structures and being engageable with the side edges of said bottom structure, when said bottom structure extends generally at right angles to the same.

4. A hand cart as in claim 1 in which the wheel means comprises a pair of carrying wheels mounted on the lower end of the frame and disposed to extend rearwardly from the plane of the same, and a single wheel mounted upon the lower side of said bottom structure, said last wheel being so disposed and dimensioned whereby the cart normally is supported with said bottom structure inclined to the horizontal, whereby the forward edge of the bottom structure is at an elevation above the rear wheels of a like adjacent cart, when two carts are positioned in close proximity.

5. A hand cart as in claim 1 in which the wheel means comprises a plurality of wheels all mounted on the bottom structure.

References Cited by the Examiner

UNITED STATES PATENTS

| | | | |
|---|---|---|---|
| 2,005,566 | 6/35 | Schwabe | 280—36 X |
| 2,452,978 | 11/48 | Woldring | 280—36 X |
| 2,461,482 | 2/49 | Schaus | 280—36 |
| 2,590,048 | 3/52 | Sides | 280—36 X |
| 2,600,611 | 6/52 | Bevington | 280—36 |
| 2,671,669 | 3/54 | Berlin | 280—36 |
| 2,918,295 | 12/59 | Milner | 280—36 |

ARTHUR L. LA POINT, *Primary Examiner.*